(12) United States Patent
Brammeier et al.

(10) Patent No.: US 11,161,494 B2
(45) Date of Patent: Nov. 2, 2021

(54) SENSING SYSTEM FOR AGRICULTURAL MACHINE

(71) Applicant: DEERE & COMPANY, Moline, IL (US)

(72) Inventors: Tyler S. Brammeier, Silvis, IL (US); Duane M. Bomleny, Geneseo, IL (US); Bradley K. Yanke, Eldridge, IA (US)

(73) Assignee: DEERE & COMPANY, Moline, IL (US)

( * ) Notice: Subject to any disclaimer, the term of this patent is extended or adjusted under 35 U.S.C. 154(b) by 30 days.

(21) Appl. No.: 16/820,296

(22) Filed: Mar. 16, 2020

(65) Prior Publication Data
US 2021/0284123 A1 Sep. 16, 2021

(51) Int. Cl.
- *F16D 7/02* (2006.01)
- *B60W 10/02* (2006.01)
- *F16D 23/10* (2006.01)

(52) U.S. Cl.
CPC ............ *B60W 10/02* (2013.01); *F16D 7/025* (2013.01); *F16D 23/10* (2013.01); *B60W 2300/158* (2013.01); *B60W 2510/0241* (2013.01); *B60W 2710/025* (2013.01); *F16D 2500/30401* (2013.01); *F16D 2500/5102* (2013.01); *F16D 2500/70426* (2013.01)

(58) Field of Classification Search
CPC .................. B60W 10/02; B60W 10/30; B60W 2300/158; B60W 2510/0241; B60W 2710/025; F16D 7/025; F16D 7/021; F16D 43/20; F16D 43/21; F16D 43/211; F16D 43/213; F16D 23/10; F16D 2500/30401; F16D 2500/5102; F16D 2500/70426; F16D 2300/18
See application file for complete search history.

(56) References Cited

U.S. PATENT DOCUMENTS

| 4,081,063 | A  | * | 3/1978 | Malmros | ............ | F16D 43/2028 |
|---|---|---|---|---|---|---|
|  |  |  |  |  |  | 192/56.3 |
| 7,739,861 | B2 |  | 6/2010 | Mackin |  |  |
| 8,230,667 | B2 | * | 7/2012 | Finkler | ............ | A01D 41/1274 |
|  |  |  |  |  |  | 56/10.2 A |
| 10,064,332 | B1 |  | 9/2018 | Ohms et al. |  |  |

(Continued)

*Primary Examiner* — Edwin A Young
(74) *Attorney, Agent, or Firm* — Michael Best & Friedrich LLP

(57) ABSTRACT

An agricultural machine configured to be operated by an operator and including a drive mechanism having a drive shaft and a gear assembly for driving an agricultural implement. The agricultural machine includes a slip clutch that has an outer sleeve operatively coupled to the gear assembly, an inner sleeve positioned within the outer sleeve and coupled to and rotatable with the drive shaft, a plurality of torque-transfer members positioned between the outer sleeve and the inner sleeve and configured to selectively couple the inner sleeve to the outer sleeve, and a position sensor in communication with one of the plurality of torque-transfer members and configured to output a signal in response to radial displacement of the one torque-transfer member being detected. The agricultural machine includes a control unit in communication with the position sensor and configured to alter an operating parameter of the machine in response to receiving the signal.

20 Claims, 12 Drawing Sheets

(56) References Cited

U.S. PATENT DOCUMENTS

| | | | | |
|---|---|---|---|---|
| 2005/0217960 A1* | 10/2005 | Kuissi | .................... | F16D 7/048 |
| | | | | 192/56.1 |
| 2006/0240944 A1* | 10/2006 | Stevenson | ............. | B60W 30/19 |
| | | | | 477/107 |
| 2014/0283490 A1 | 9/2014 | Ritter et al. | | |
| 2016/0040733 A1* | 2/2016 | Staniewicz | ............ | B60K 25/02 |
| | | | | 701/67 |
| 2018/0272516 A1 | 9/2018 | Hecht et al. | | |

* cited by examiner

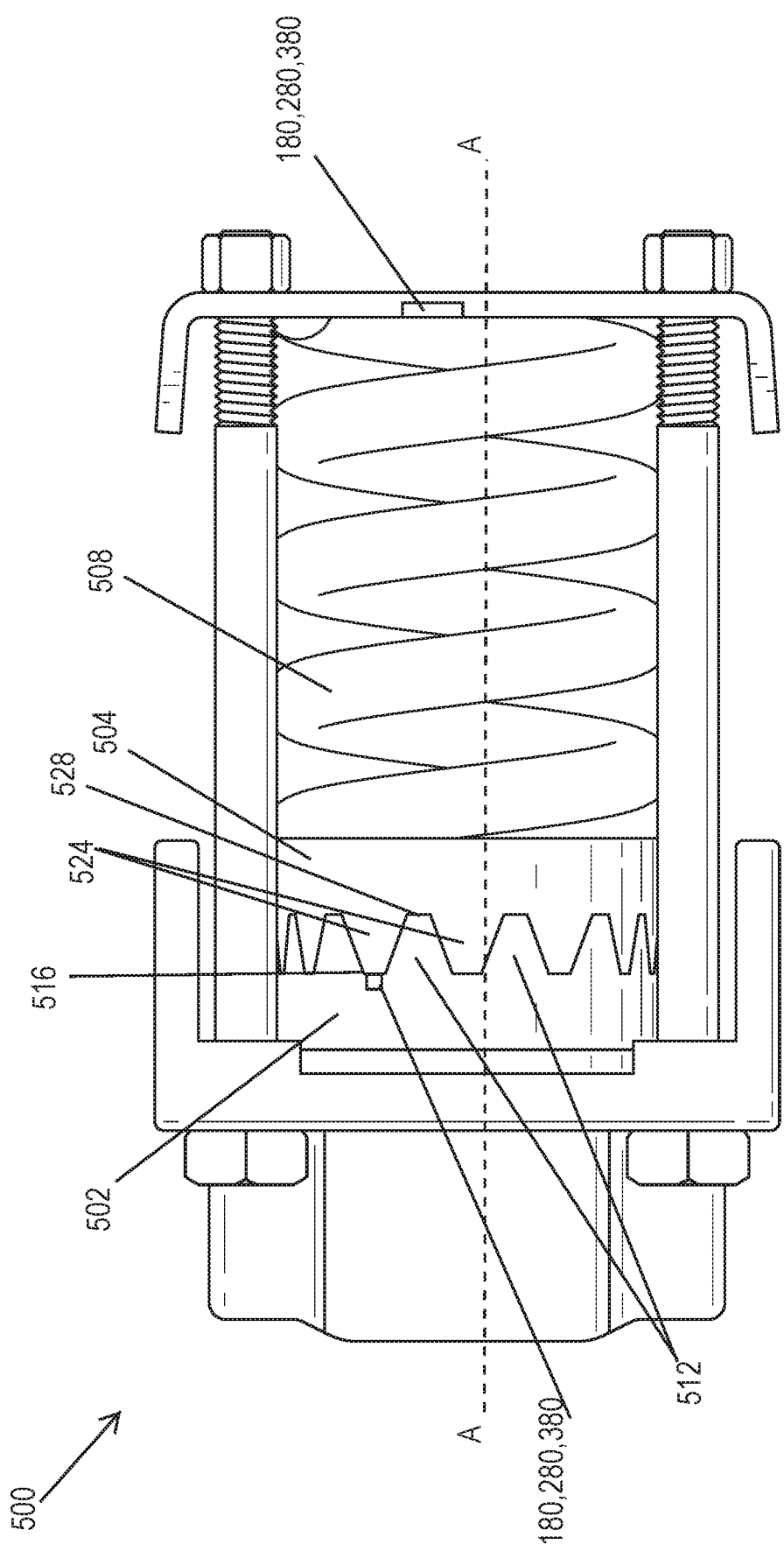

SENSING SYSTEM FOR AGRICULTURAL MACHINE

FIELD OF THE DISCLOSURE

The present disclosure relates to a sensing system for an agricultural machine. In particular, the present disclosure relates to a sensing system that determines whether a slip clutch is going to slip or has slipped.

SUMMARY

In one aspect, an agricultural machine is configured to be operated by an operator and includes an agricultural implement supported by the machine, an engine configured to drive the machine, a drive mechanism including a drive shaft that operatively couples the engine to the agricultural implement, and a gear assembly operably coupled to the agricultural implement. The gear assembly is selectively coupled to the drive shaft by a slip clutch. The slip clutch includes an outer sleeve operatively coupled to the gear assembly, an inner sleeve positioned within the outer sleeve and coupled to and rotatable with the drive shaft, a plurality of torque-transfer members positioned between the outer sleeve and the inner sleeve and configured to selectively couple the inner sleeve to the outer sleeve, and a position sensor in communication with one at least one of the plurality of torque-transfer members and configured to output a signal in response to radial displacement of the one torque-transfer member being detected. The agricultural machine also includes a control unit in communication with the position sensor and configured to alter an operating parameter of the machine in response to receiving the signal.

In another aspect, a drive mechanism subassembly includes a drive shaft and a gear assembly selectively coupled to the drive shaft by a slip clutch. The slip clutch that has an outer sleeve operatively coupled to the gear assembly, an inner sleeve positioned within the outer sleeve and coupled to and rotatable with the drive shaft, a torque-transfer member movably coupled to the inner sleeve and configured to selectively couple the inner sleeve to the outer sleeve when a torque on the drive shaft is at a first value that is less than a predetermined threshold, and a position sensor in communication with the torque-transfer member and configured to output a signal in response to the torque on the drive shaft increasing from the first value. A control unit is in communication with the position sensor and configured to determine that the clutch is beginning to slip in response to receiving the signal.

In another aspect, a drive mechanism subassembly includes a drive shaft and a gear assembly selectively coupled to the drive shaft by a clutch. The clutch that has a gear assembly engaging member operatively coupled to the gear assembly, a drive shaft engaging member operatively coupled to the drive shaft and configured to selectively engage the gear assembly engaging member, and a sensor at least partially supported by the gear assembly engaging member and configured to output a signal in response to a differential torque between the gear assembly engaging member and the drive shaft engagement member being above a predetermined threshold. A control unit is in communication with the position sensor and configured to alter an operating parameter of the machine in response to receiving the signal.

In addition, other aspects of the disclosure will become apparent by consideration of the detailed description and accompanying drawings.

BRIEF DESCRIPTION OF THE DRAWINGS

FIG. 13 is a side view of another type of clutch assembly, the clutch assembly having another sensor configuration.

DETAILED DESCRIPTION

Before any aspects of the disclosure are explained in detail, it is to be understood that the disclosure is not limited in its application to the details of construction and the arrangement of components set forth in the following description or illustrated in the following drawings. The disclosure is capable of supporting other aspects and being practiced or being carried out in various ways. Also, it is to be understood that the phraseology and terminology used herein is for the purpose of description and should not be regarded as limiting. Terms of degree, such as "substantially," "about," "approximately," etc. are understood by those of ordinary skill to refer to reasonable ranges outside of the given value, for example, general tolerances associated with manufacturing, assembly, and use of the described aspects.

Figure 1:
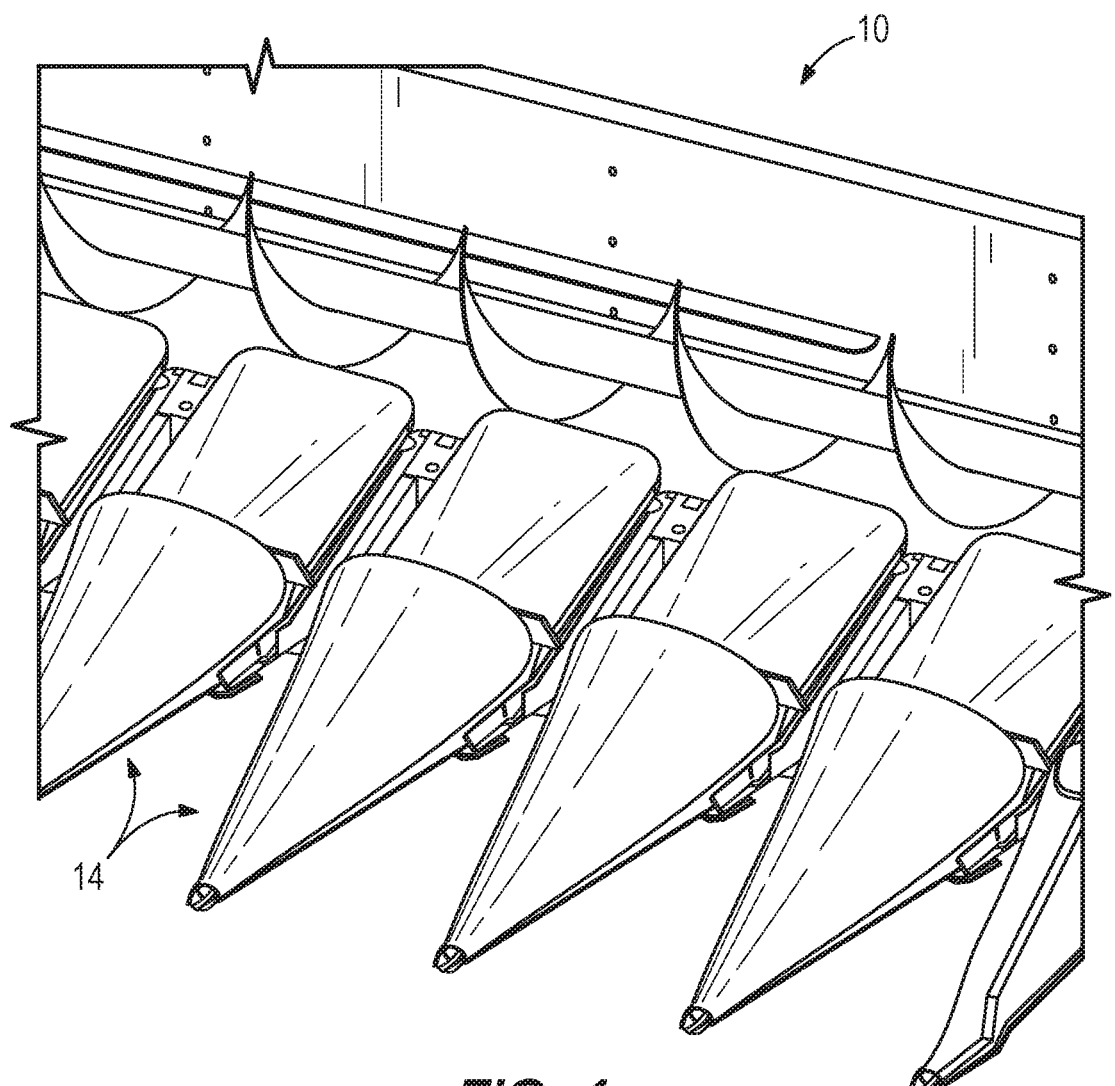
FIG. 1 is a front perspective view of a portion of a header of an agricultural machine, the header including a plurality of agricultural implements.
Figure 2:
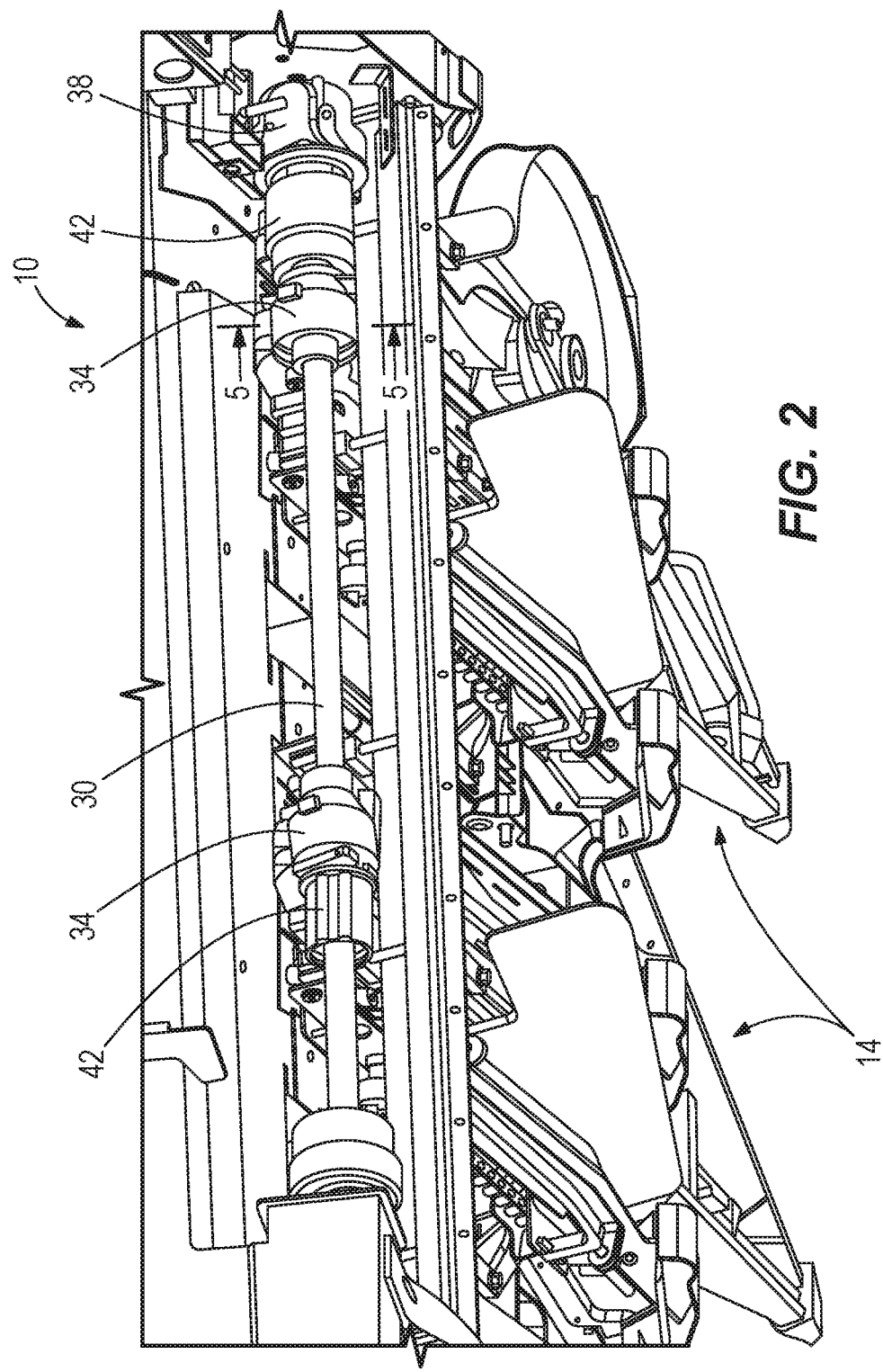
FIG. 2 is a rear perspective view of a portion of the header of FIG. 1, the header including the agricultural implements, a drive shaft, and at least one clutch.

FIGS. 1 and 2 show a portion of a header 10 of an agricultural machine (e.g., combine harvester). The header 10 includes a plurality of agricultural implements supported by the machine and driven by an engine thereof. The agricultural implements 14 of FIGS. 1 and 2 are in the form of row units 14, each of which has a pair of chains (not shown) that rotate to advance product (e.g. corn ears, grain, etc.) through the machine. The agricultural machine may also include a plurality of choppers (not shown) for chopping the stalks of the product. A drive shaft 30 (FIG. 2) operatively couples the engine to the row units 14 and the chopper. In particular, the drive shaft 30 may include a plurality of first gear assemblies 34 and a plurality of second gear assemblies 38 (only one of which is shown). Each of the first gear assemblies 34 drives a corresponding row unit 14, and each of the second gear assemblies 38 drives a corresponding chopper. Each of the first and second gear assemblies 34, 38 are operably coupled to and driven by a slip clutch 42. The slip clutch 42 may be a singular drive clutch or a dual drive clutch.

Figure 3:
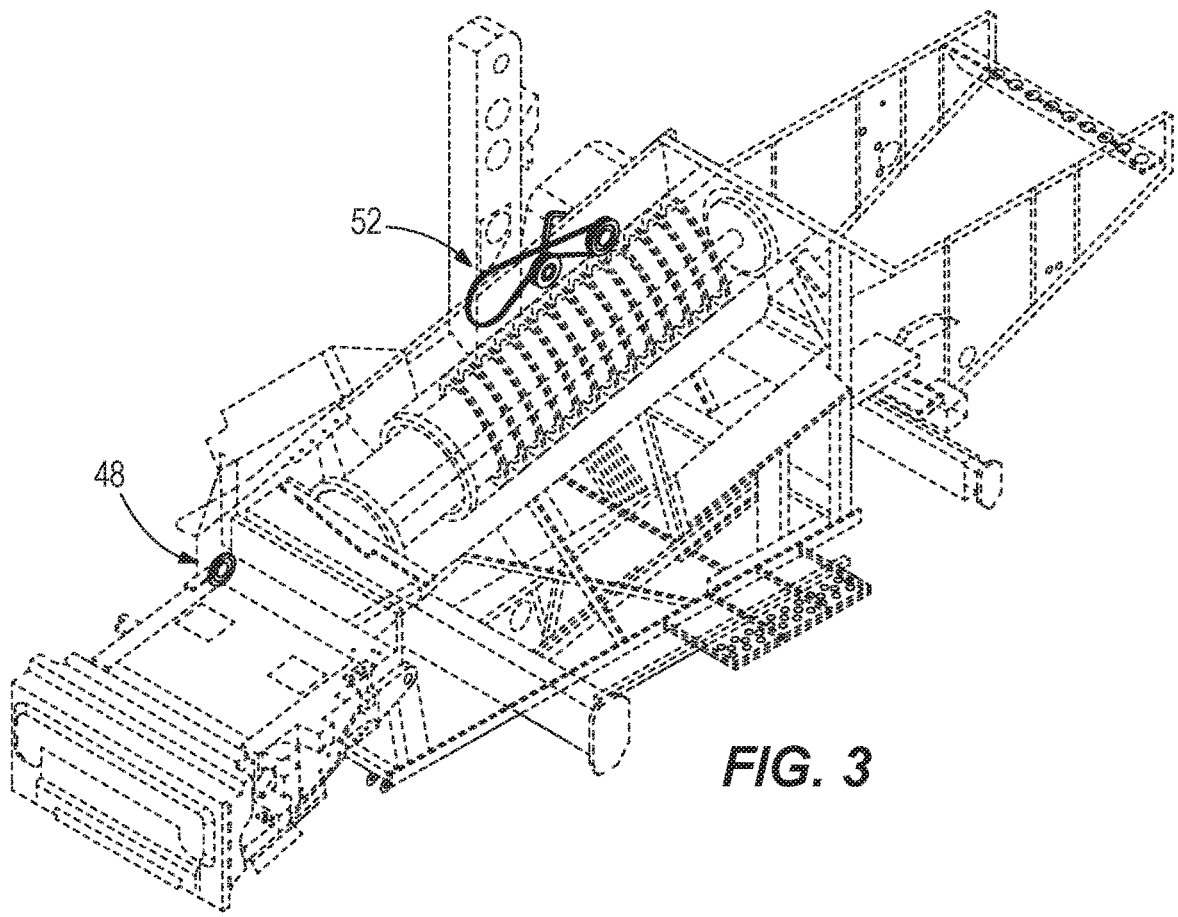
FIG. 3 is a perspective view of an agricultural machine that has an elevator drive including the clutch of FIG. 2 and a feederhouse drive chain including the clutch of FIG. 2.
Figure 4:
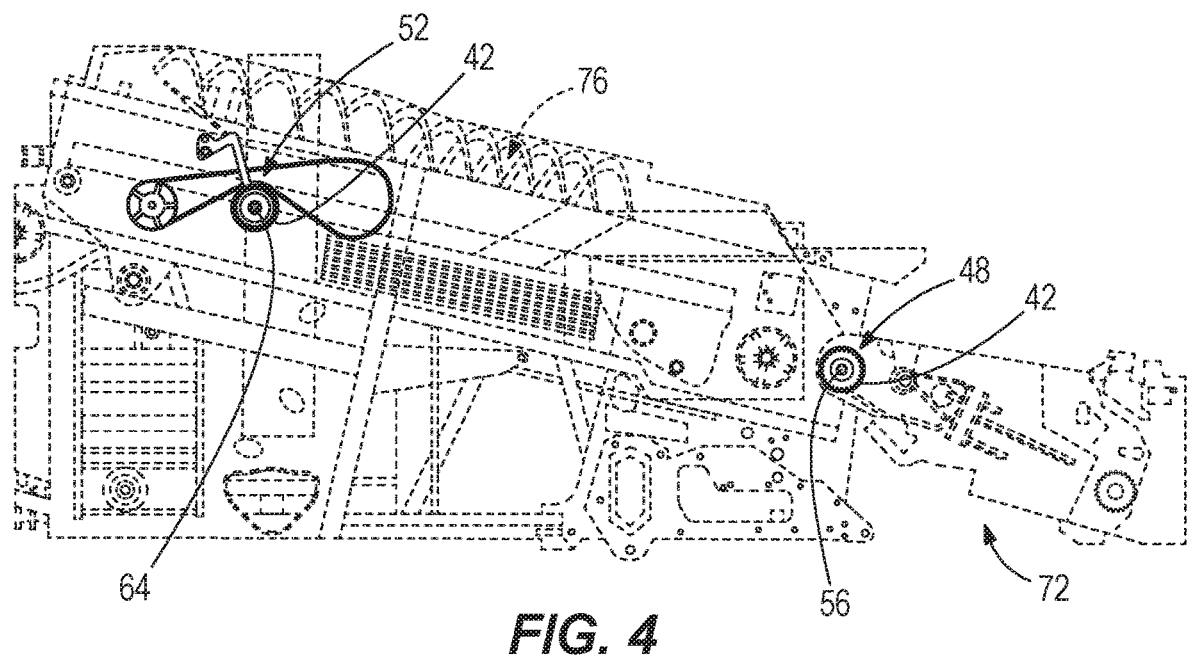
FIG. 4 is a side view of the agricultural machine of FIG. 3.

While the slip clutches 42 are shown relative to the header in FIGS. 1 and 2, it should be understood that slip clutches 42 are used elsewhere in agricultural machines to drive other agricultural implements, as well. For example, and without limitation, slip clutches 42 are used in connection with a feederhouse conveyor chain drive 48 and an elevator drive 52 (FIGS. 3 and 4). The drive shaft 56 of the feederhouse conveyor chain drive 48 drives the feederhouse conveyor, while the drive shaft 64 of the elevator drive 52 drives an elevator that moves product from the feederhouse 72 to a threshing rotor 76 that breaks apart the product.

Each slip clutch 42 has a longitudinal axis A (FIG. 9), a radius R (FIGS. 5-8), an outer sleeve 100 (e.g., a gear-assembly engagement member), an inner sleeve 104 (e.g., a drive-shaft engaging member), and a plurality of detents or torque-transfer members 108 that are coupled to the inner sleeve 104 and extend radially between the inner sleeve 104 and the outer sleeve 100.

The outer sleeve 100 is operatively coupled to an output gear shaft (not shown) of the respective corresponding gear assembly by a coupling member 110 (FIG. 10) having a plurality of splines or teeth 110*a*. The outer sleeve 100 has an aperture 112 extending therethough, an inner surface 116, and a plurality of recesses 120 that are positioned circumferentially in the inner surface 116. In the illustrated embodiment, each of the recesses 120 includes tapered surfaces 124 (e.g., ramps) on opposite sides of central surface 128. The tapered surfaces 124 define complementary axes B, B'. In other embodiments, the recesses 120 may have any suitable configuration. The inner sleeve 104 defines an aperture 140 and includes a plurality of bores 144 that extend therethrough. The bores 144 are positioned circumferentially about outer surface 148 of the inner sleeve 104. The inner sleeve 104 is at least partially positioned within the aperture 112 of the outer sleeve 100 and is concentric with the outer sleeve 100. The aperture 140 in the inner sleeve 104 is configured to receive the drive shaft 30 therethrough. In the illustrated embodiment, the drive shaft 30 has a hexagonal cross-section and the aperture 140 is also hexagonal. The hexagonal shape of the drive shaft 30 and the aperture 140 provide torque transfer therebetween while still allowing the clutch 42 to slide laterally along the drive shaft 30 as the frame of the header 10 flexes elastically through various load and temperature fluctuations.

Figure 5:
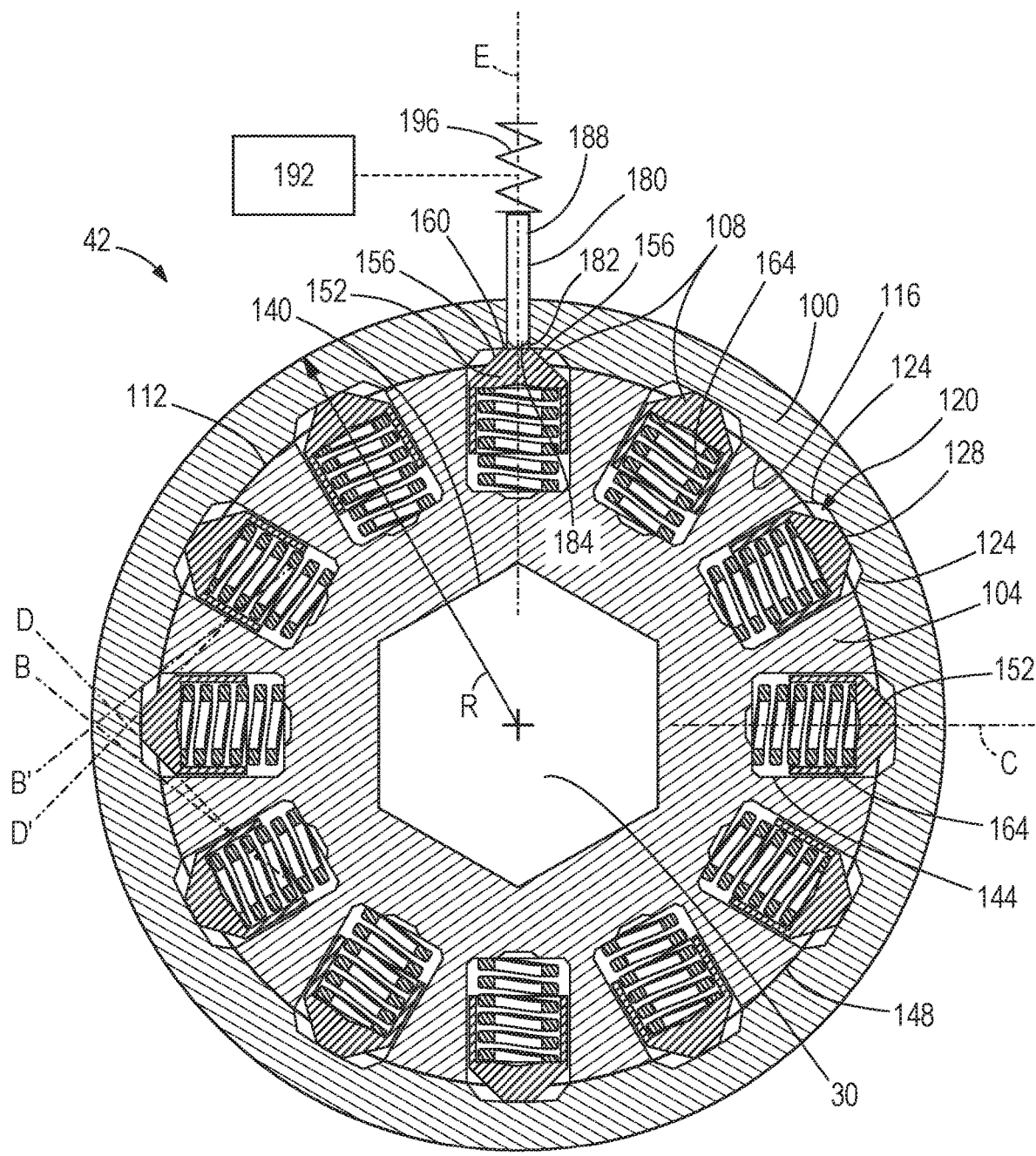
FIG. 5 is a cross-sectional view of the clutch of FIG. 2 along the line 5-5 of FIG. 2, the clutch having a sensor configuration that is in a first position.

As shown in at least FIG. 5, one torque-transfer member 108 is positioned within each bore 144 of the inner sleeve 104. As shown, each torque-transfer member 108 has an axis C and a distal end 152 that projects from the outer surface 148 of the inner sleeve 104. The distal end 152 is configured to be received by a recess 120 in the outer sleeve 100. The torque-transfer member 108 includes tapered surfaces 156 (e.g., ramps) on opposite sides of a central surface 160. The tapered surfaces define axes D, D'. A biasing member 164 (e.g., a spring) is positioned within each bore 144 and biases each torque-transfer member 108 outwardly (e.g., towards the outer sleeve 100) and into the respective recess 120 in the outer sleeve 100.

As shown in FIGS. 5-9, the slip clutch 42 has a sensor 180 that is at least partially supported by the outer sleeve 100. In the embodiment of FIGS. 5-9, the sensor 180 is a position sensor 180 that is positioned between the outer sleeve 100 and the inner sleeve 104 and is configured to detect when the clutch 42 has slipped. That is, the position sensor 180 is configured to detect radial displacement of one of the torque-transfer members 108. In FIGS. 5-9, the position sensor 180 is a pin that extends through and is slidable relative to the outer sleeve 100. The pin 180 has a longitudinal axis E, a first end 184 that engages the torque-transfer member 108 and a second end 188 that is spaced apart from the first end 184 and in communication with a control unit 192. In the illustrated embodiment, the pin 180 has chamfered edges 182. The control unit 192 is in communication with a cab (not shown) of the agricultural machine.

Figure 6:
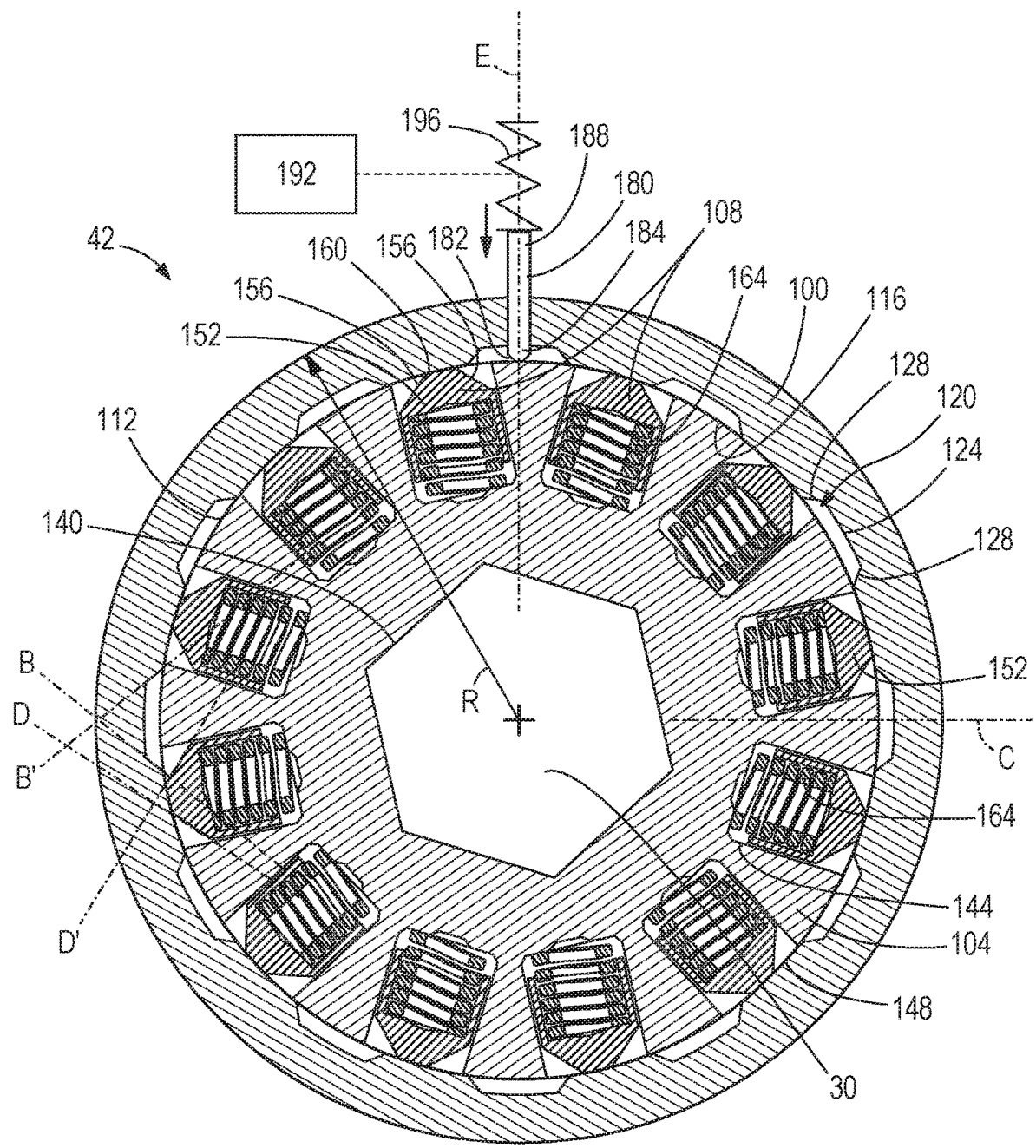
FIG. 6 is a cross-sectional view of the clutch of FIG. 2 along the line 5-5 of FIG. 2, the sensor of FIG. 5 being in a second position.
Figure 8:
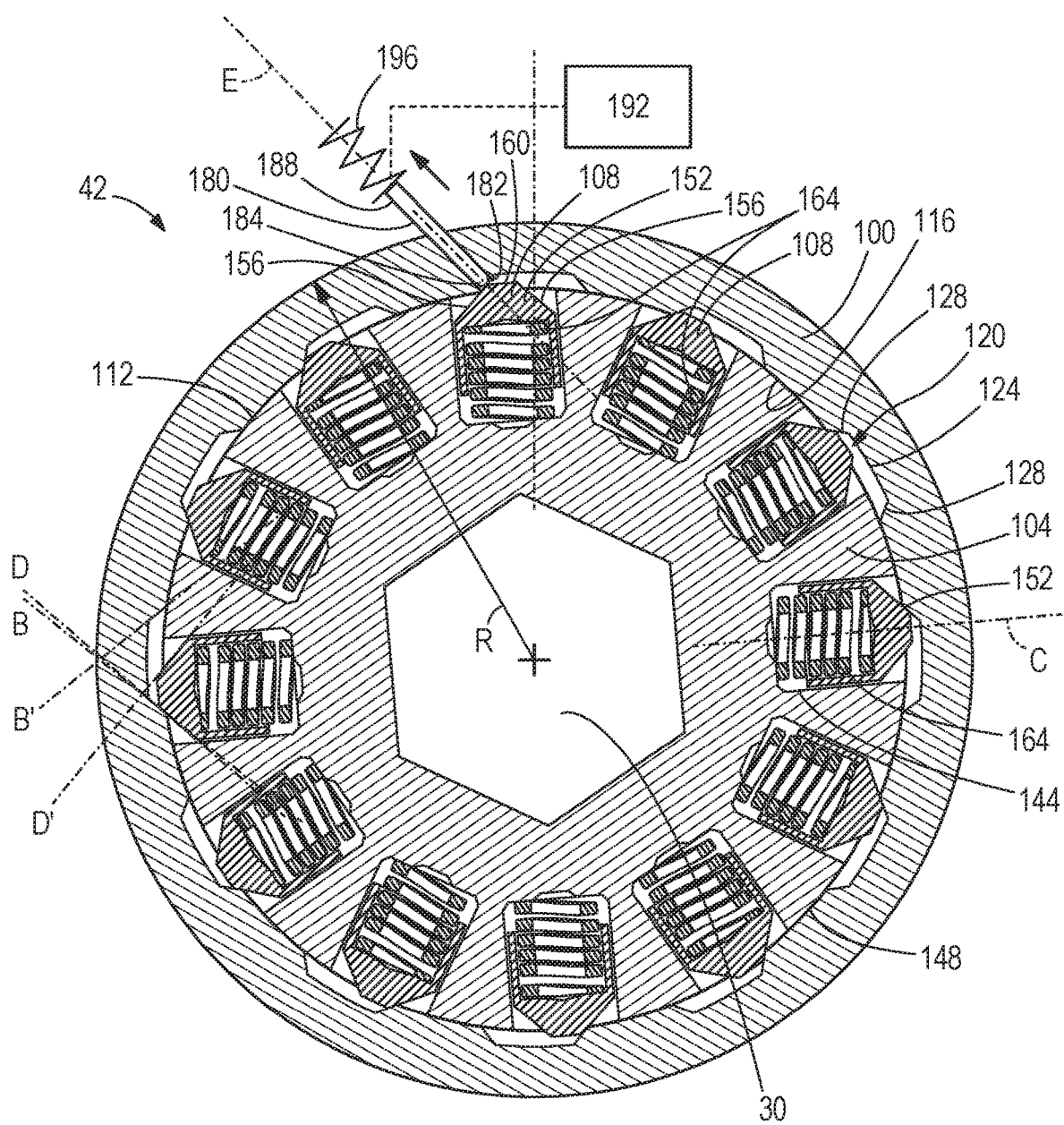
FIG. 8 is a cross-sectional view of the clutch of FIG. 2 along the line 5-5 of FIG. 2, the sensor of FIG. 7 being in a second position.
Figure 9:
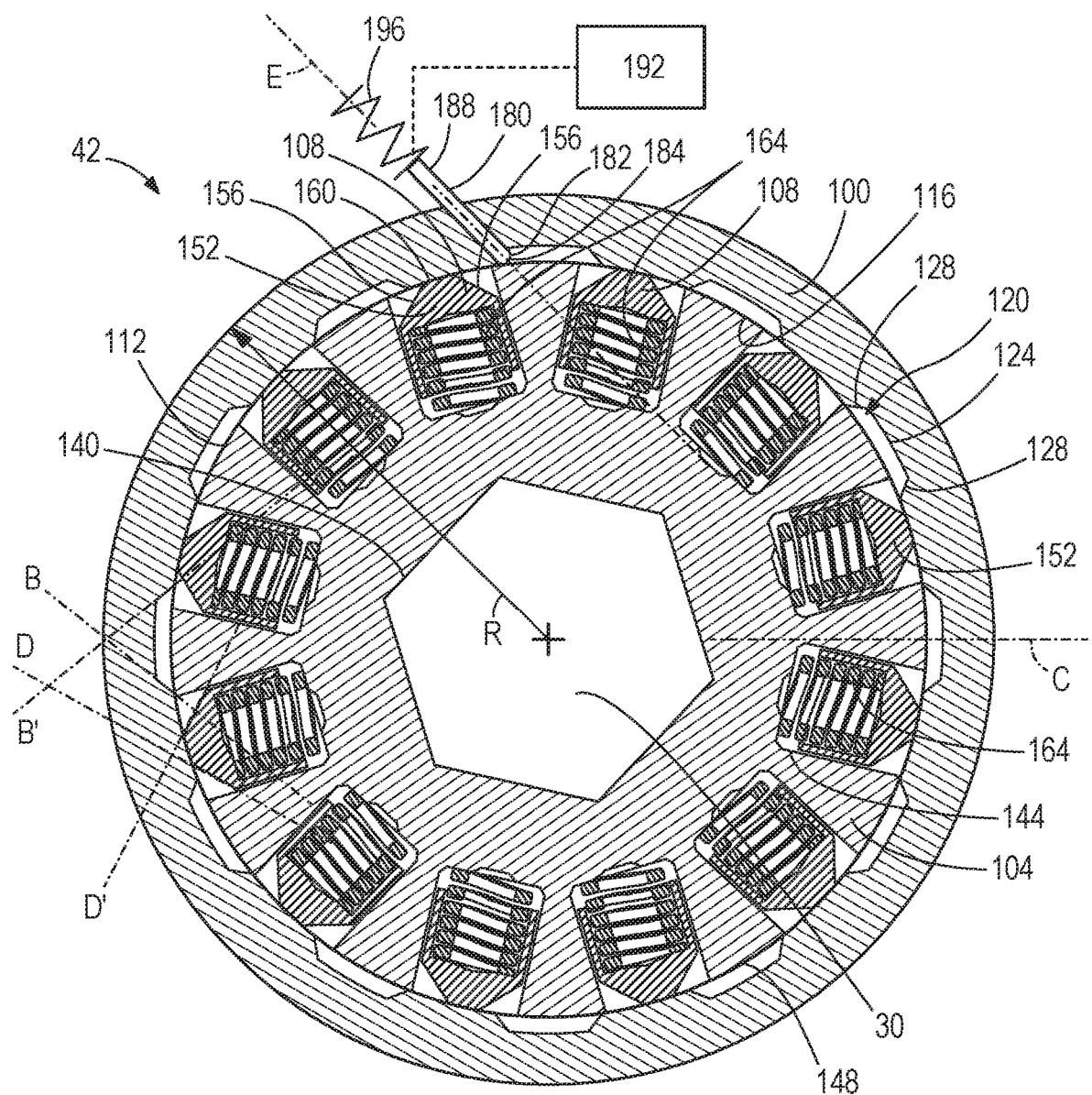
FIG. 9 is a cross-sectional view of the clutch of FIG. 2 along the line 5-5 of FIG. 2, the sensor of FIG. 7 being in a third position.

In FIGS. 5-6 and 9, the pin 180 is oriented radially relative to the slip clutch 42 (e.g., along and aligned with the radius R). That is, the pin 180 is oriented perpendicular relative to both the central surface 128 of the recess 120 and the central surface 160 of the torque-transfer member 108. Accordingly, the axis E of the pin 180 is parallel to the axis C of the corresponding torque-transfer member 108. In the embodiments of FIGS. 5-6 and 9, the pin 180 is biased (e.g., by a spring 196) radially inward. In the embodiments of FIGS. 5-9, there is a single position sensor 180 that is in communication with a single torque transfer member 108. In other or additional embodiments, one or more torque transfer members may be in communication with the position sensor 180 or each torque transfer member 108 may be in communication with a respective position sensor 180.

With respect to FIG. 5, when the differential torque between the outer sleeve 100 and inner sleeve 104 is below a predetermined threshold (e.g., when the chains of the row unit 14 are rotating normally), the slip clutch 42 is in a first (e.g., unslipped) position in which each of the distal ends 152 of the torque-transfer members 108 are properly positioned in the recesses 120 of the outer sleeve 100. Accordingly, the outer sleeve 100 rotates with the inner sleeve 104 such that the drive shaft 30 actuates the respective gear assembly 34, 38. Also, the pin 180 is in a first position in which the first end 184 is positioned (e.g., biased) against and engages with the torque-transfer member 108.

With respect to FIG. 6, when the differential torque between the outer sleeve 100 and inner sleeve 104 is at or above a predetermined threshold (e.g., when one or more of the chains of the row unit 14 is jammed and therefore not rotating normally), the slip clutch 42 moves from the first position to a second (e.g., slipped position) in which the distal ends 152 of each of the plurality of torque-transfer members 108 are displaced from the corresponding one of the plurality of recesses 120 in the outer sleeve 100. That is, a force exerted on the torque-transfer members 108 overcomes the bias of the springs 164 to move the torque-members out of the recesses 120 of the outer sleeve 100. Also, the pin 180 is in a second position in which the first end 184 does not engage the torque-transfer member 108 and is instead positioned in the corresponding recess 120. When the torque-transfer members 108 are displaced from the recesses 120 in the outer sleeve 100, the clutch 42 is said to have slipped. Accordingly, the outer sleeve 100 does not rotate with the inner sleeve 104 such that the inner sleeve 104 and the drive shaft 30 continue to rotate but the outer sleeve 100 and the corresponding gear assembly 34, 38 does not, thereby protecting the gear assembly 34, 38 from wear.

As shown in FIG. 6, when the clutch 42 has slipped, the spring 196 displaces the pin 180 radially inward from the first position to the second position, which causes a signal to be sent to the control unit 192. The control unit 192 may then notify the operator in the cab or a remote manager the clutch 42 has slipped (e.g., by an audio or visual alarm). In response to the signal, the control unit 192 may also adjust an operating parameter of one or more automated control systems of the agricultural machine. For example, the control unit 42 may decrease the ground speed of the agricultural machine, adjust a valve that meters flow into a material transfer mechanism, close down a gate to at least partially restrict product flow into an unloader sump, temporarily pause operation, and/or reverse the rotational direction of the slipping drive shaft to dislodge the cause of the slip and attempt to recover normal forward operation at a modified speed or other operating parameter. Alternatively, the control unit 192 may directly adjust an operating parameter of one or more automated control systems of the agricultural machine, as discussed herein. Once the torque has returned to at or below the predetermined threshold, each of the distal ends 152 of the torque-transfer members 108 moves back to its proper position in the recesses 120 of the outer sleeve 100, and the pin 180 resets.

Figure 7:
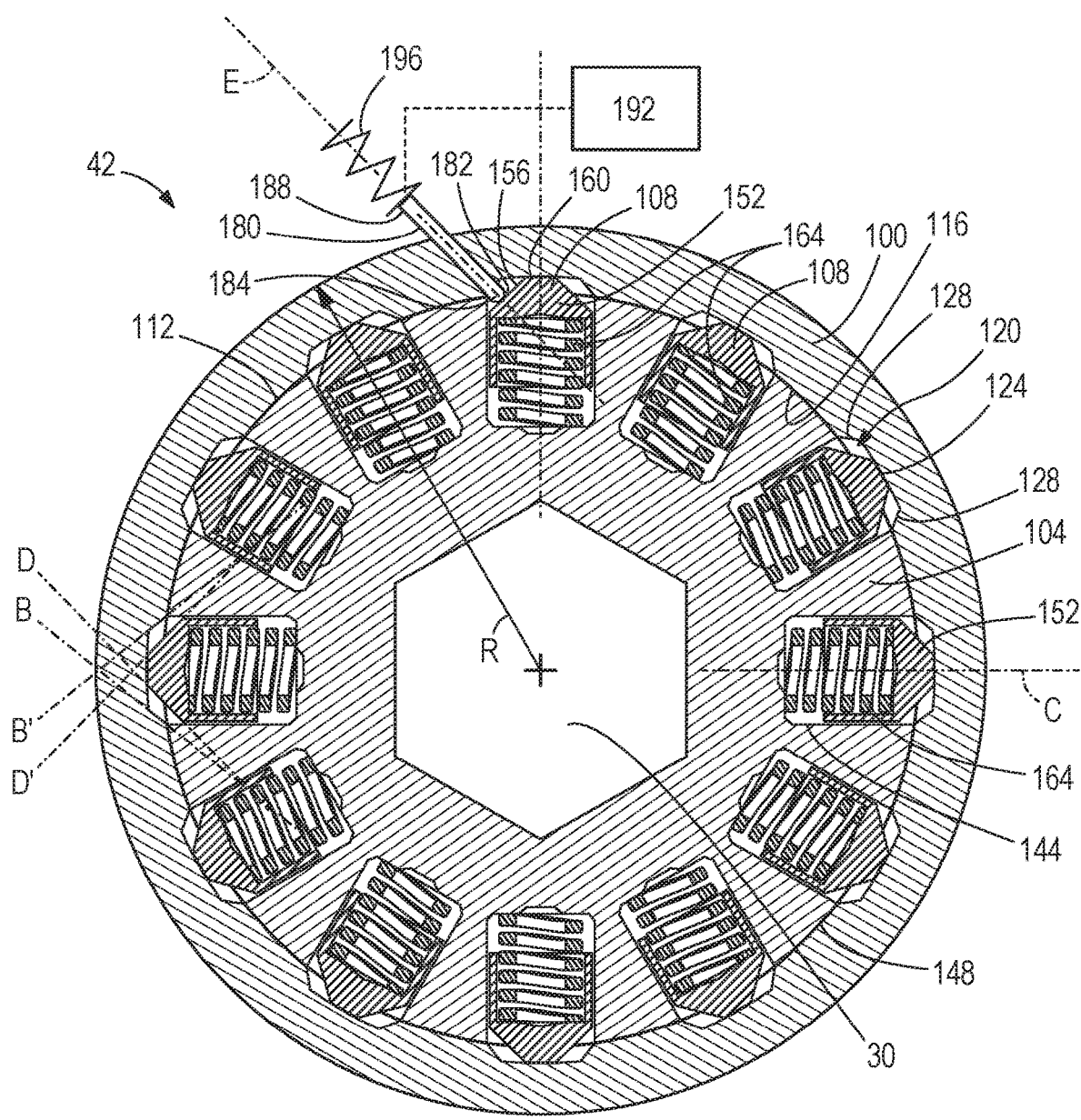
FIG. 7 is a cross-sectional view of the clutch of FIG. 2 along the line 5-5 of FIG. 2, the clutch assembly having another sensor configuration, the sensor being in a first position.

In FIGS. 7-8, the pin 180 is unaligned with the Radius R of the slip clutch 42. As shown, the pin 180 is angled (e.g., positioned at a non-parallel angle) relative to the radius R of the slip clutch 42. The axis E of the pin 180 is oriented at a non-parallel angle relative to the radius R. More specifically, the pin 180 is oriented perpendicular relative to one of the tapered surfaces 156 of the torque-transfer member 108, and therefore at a non-parallel angle relative to axis C of the corresponding torque-transfer member 108. Like the pin 180 of FIGS. 5-6, the pin 180 of FIGS. 7-8 is biased (e.g., by a spring 296) against the torque-transfer member 108 and, more specifically, the tapered surface 156 thereof. The pin 180 of FIGS. 7-8 may operate in the same way that the pin 180 of FIGS. 5-6 operates to address the slipped clutch 42 and control the operating parameters of the agricultural machine.

Additionally or alternatively, the pin 180 may operate to warn the operator that clutch 42 is beginning to slip prior to alerting the operator that the clutch has slipped. That is, the differential torque between the outer sleeve 100 and inner sleeve 104 increases from a first value that is less than the predetermined threshold to the predetermined threshold, the slip clutch 42 begins to move from the first position to the second position. In particular, the torque-transfer members 108 rotate with the inner sleeve 104 such that the tapered surface 156 of the torque-transfer member 108 slides against the side (e.g., tapered surface 124) of the recesses 120. The tapered surface 156 of one of the torque-transfer members 108 thus begins to gradually move (e.g., slide) the pin 180 such that the pin 180 gradually recedes into the outer sleeve 100. The pin 180 moves linearly as a function of the angle of taper of the tapered surface 156. Accordingly, a correlation can be made between the torque applied to the corresponding torque-transfer member 108 and the linear movement of the pin 180 as the torque increases from below the predetermined threshold to the predetermined threshold. Therefore, linear movement of the pin 180 as it recedes into the outer sleeve 100 against the bias of the spring 296 generates a warning signal. As shown in FIG. 8, if the clutch 42 begins to slip, the warning signal may be sent to the control unit 192. The control unit 192 may then send a first notification (e.g., by a first audio or visual alarm) to the operator in the cab or the remote manager notifying the operator that the clutch 42 is beginning to slip. If the clutch 42 does slip, the slipped signal (discussed with respect to FIGS. 5-6) is sent to the control unit 192. The control unit 192 may then send a second notification (e.g., by a first audio or visual alarm) to the operator in the cab notifying the operator that the clutch 42 has slipped. The first notification may be the same as or different from the second notification. In response to the either or both of the first notification or second notification, the control unit 192 may also adjust an operating parameter of one or more automated control systems of the agricultural machine, as discussed above with respect to the pin 180 of FIGS. 5-6. Alternatively, the control unit 192 may directly send the first notification and the second notification to the one or more automated control systems of the agricultural machine to adjust an operating parameter, as discussed above. Once the torque has returned to at or below the predetermined threshold, each distal end 152 of the torque-transfer members 108 moves back to its properly positioned in the recesses 120 of the outer sleeve 100, and the pin 180 resets.

Figure 10:
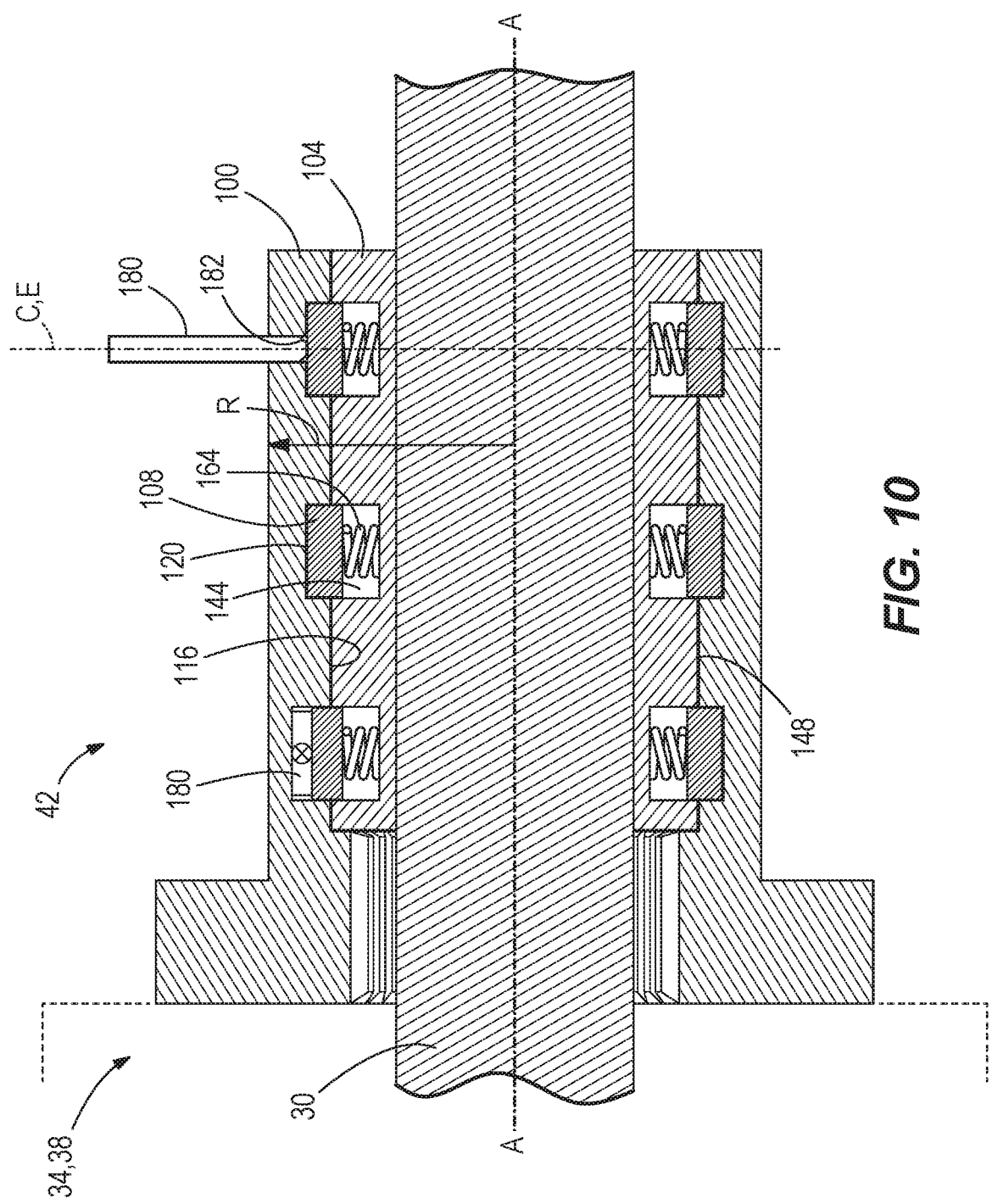
FIG. 10 is a cross-sectional view of the drive shaft of FIG. 2 along a longitudinal axis 'A' illustrating the sensor of FIGS. 5 and 6 and another sensor.

FIG. 10 illustrates the position sensor as a pressure plate or force plate 180, rather than a pin. The pressure plate 180 of FIG. 10 is capable of all of the same functionality as the pin of FIGS. 5-6 or the pin of FIGS. 7-8. FIG. 10 also illustrates that there may be more than one position sensor 180 in the clutch assembly and that the position sensors 180 may be the same or different.

Figure 11:
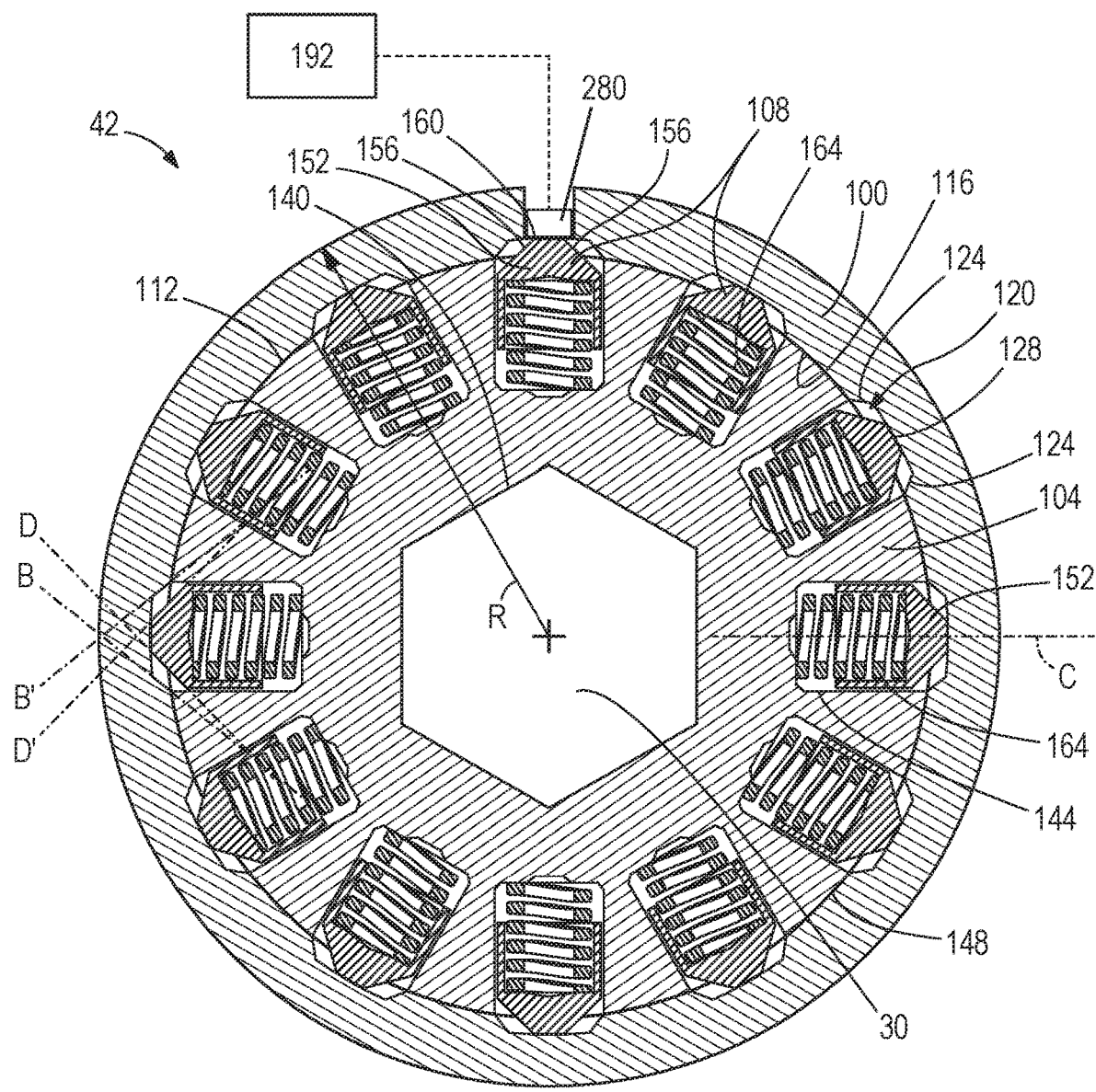
FIG. 11 is a cross-sectional view of the clutch of FIG. 2 along the line 5-5 of FIG. 2, the clutch assembly having another sensor configuration.

FIG. 11 shows the slip clutch 42 including another type of sensor 280. As shown, in FIG. 11, the sensor 280 is positioned near (e.g., in close proximity) to the recess 180 of the outer sleeve 100. In the illustrated embodiment, the sensor is a non-contact sensor such as a magnetic pick-up sensor or a Hall Effect sensor. In either case, the sensor 280 detects the proximity of the respective torque transfer member 108 to determine whether the clutch 42 is in the first position or the second position. For example, when the clutch has moved from the first position to the second position, the sensor 280 detects that the torque transfer member 108 has moved further away from the sensor 280, which causes a signal to be sent to the control unit 192. The control unit 192 then notifies the operator in the cab the clutch 42 has slipped (e.g., by an audio or visual alarm). In response to the signal, the control unit 192 may also adjust an operating parameter of one or more automated control systems of the agricultural machine.

Figure 12:
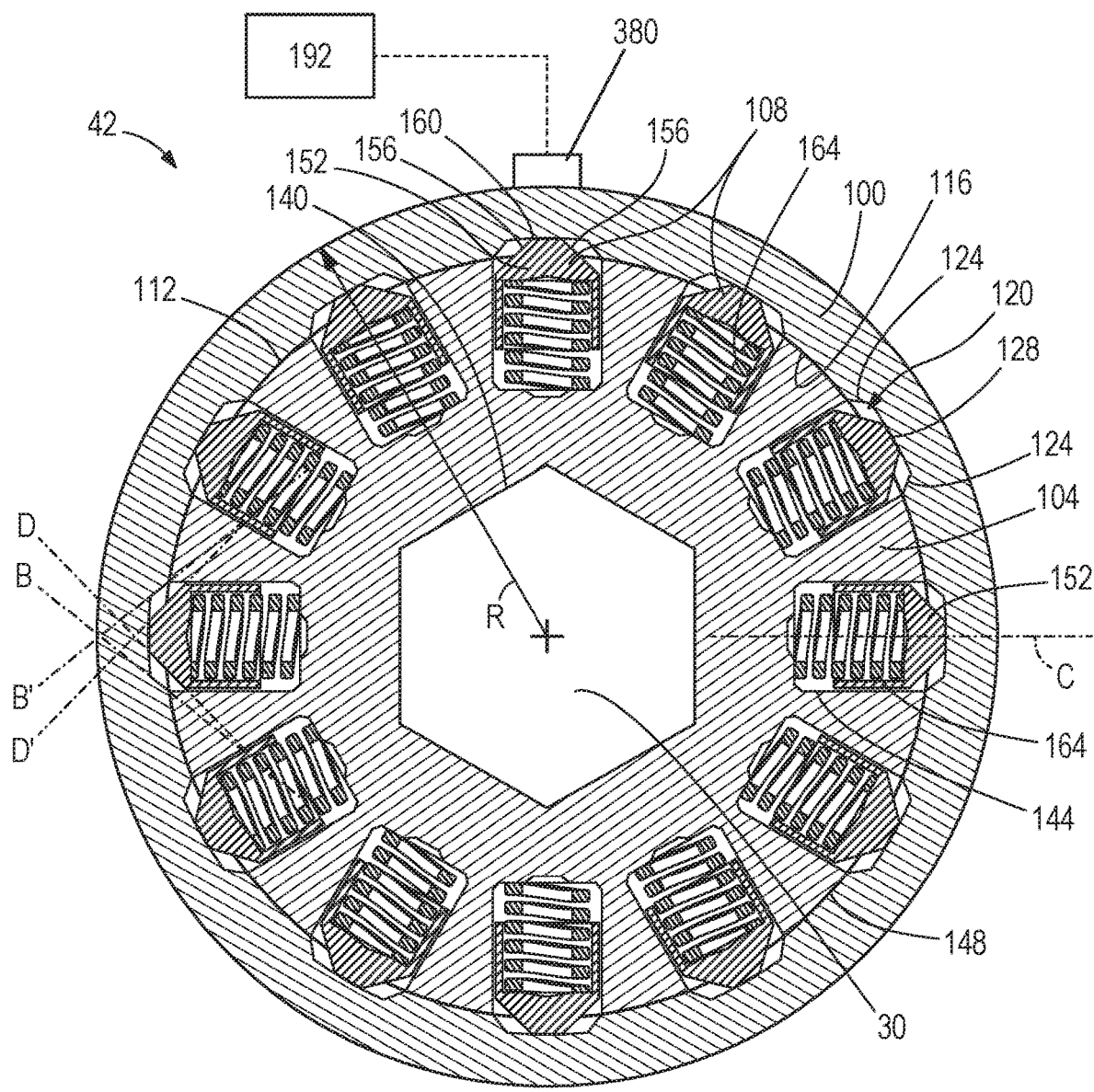
FIG. 12 is a cross-sectional view of the clutch of FIG. 2 along the line 5-5 of FIG. 2, the clutch assembly having another sensor configuration.

FIG. 12 shows a sensor 380 positioned generally on the outer sleeve 100 of the slip clutch 100. In the illustrated embodiment, the sensor 380 may be an accelerometer that detects vibration when the torque-transfer members 108 move into and out of the recesses 120. The sensor 380 may alternatively be a thermocouple sensor that detects a temperature increase in the outer sleeve when clutch 42 is slipping. For example, the sensor 280 detects that an increased vibration or increased temperature when the torque transfer members 108 are moving into and out of the recesses 120 and between the first and second positions. The increase in vibrations or temperature causes a signal to be sent to the control unit 192. The control unit 192 then notifies the operator in the cab the clutch 42 has slipped (e.g., by an audio or visual alarm). In response to the signal, the control unit 192 may also adjust an operating parameter of one or more automated control systems of the agricultural machine.

The sensors 180, 280, 380 discussed herein may be used with any suitable type of clutch assembly. For example, the sensors 180, 280, 380 may be used with a jaw clutch assembly 500, as shown in FIG. 13. The jaw clutch assembly 500 includes a longitudinal axis A, a first jaw member 502 (e.g., a gear-assembly engagement member), a second jaw member 504 (e.g., a drive-shaft engaging member), and a biasing member (e.g., spring) 508. The first jaw member 502 has a first plurality of teeth 512 (e.g., torque transfer members), and each pair of adjacent teeth 512 are separated by a valley 516. The second jaw member 504 has a second plurality of teeth 524 (e.g., torque transfer members), and each pair of adjacent teeth 524 are separated by a valley 528. The first jaw member 502 and the second jaw member 504 are complementary and configured to engage one another. That is, each of the first plurality of teeth 512 is configured to be received in one of the valleys 528, and each of the second plurality of teeth 524 is configured to be received in one of the valleys 516. The biasing member 508 is configured to bias the second jaw member 504 into engagement with the first jaw member 502 such that the first and second jaw members 502, 504, and therefore the respective gear assembly 34, 36 and shaft 30 (for example), rotate together. When the differential torque between the first and second jaw members 502, 504 exceeds a predetermined threshold (e.g., the force imparted by the bias of the spring 508), the jaw clutch assembly 500 begins to slip.

The sensor 180, 280, 380 may be supported by one of the first or the second jam members 502, 504 (e.g., one of the gear assembly engaging member or the drive shaft engaging member). For example, as shown in FIG. 13, the sensor 180, 280, 380 may be positioned in or adjacent one of the valleys 516 of the first jaw member 502. In other or additional embodiments, there may be multiple sensors 180, 280, 380, each positioned in or adjacent to one valley 516 of the first jaw member 502. Alternatively, in other or additional embodiments, the sensor 180, 280, 380 may be positioned in or adjacent one of the valleys 528 of the second jaw member 504 or there may be multiple sensors 180, 280, 380, each positioned in or adjacent to one valley 528 of the second jaw member 504. Regardless, the sensor 180, 280, 380 may operate as discussed relative to FIGS. 1-12 above to detect movement of the respective teeth 512, 524 relative to the valley of the respective jaw member 502, 504, and therefore relative movement of the first and second jaw members 502, 504.

In still other embodiments, the sensor 180, 280, 380 may be positioned in or adjacent one end of the biasing member 504. FIG. 13 shows an alternative position of the sensor 180, 280, 380 on or adjacent to a distal end of the biasing member 508, but in other or additional embodiments, the sensor 180, 280, 380 may be positioned at the proximal end. Regardless, the sensor 180, 280, 380 may operate as discussed relative to FIGS. 1-12 above to detect movement the biasing member 508, and therefore, relative movement of the first and second jaw members 502, 504.

Although the disclosure has been described in detail with reference to certain preferred aspects, variations and modifications exist within the scope and spirit of one or more independent aspects of the disclosure as described. Various features and advantages of the disclosure are set forth in the following claims.

What is claimed is:

1. An agricultural machine configured to be operated by an operator, the agricultural machine comprising:
   an agricultural implement supported by the machine;
   an engine configured to drive the machine;
   a drive mechanism including a drive shaft that operatively couples the engine to the agricultural implement;
   a gear assembly operably coupled to the agricultural implement, the gear assembly being selectively coupled to the drive shaft by a slip clutch, the slip clutch including
   an outer sleeve operatively coupled to the gear assembly,
   an inner sleeve positioned within the outer sleeve, the inner sleeve coupled to and rotatable with the drive shaft,
   a plurality of torque-transfer members positioned between the outer sleeve and the inner sleeve and configured to selectively couple the inner sleeve to the outer sleeve, and
   a position sensor in communication with at least one of the plurality of torque-transfer members and configured to output a signal in response to radial displacement of the at least one torque-transfer member being detected; and
   a control unit in communication with the position sensor and configured to alter an operating parameter of the machine in response to receiving the signal.

2. The agricultural machine of claim 1, wherein the position sensor is a spring-biased pin aligned with a radius of the slip clutch.

3. The agricultural machine of claim 1, wherein the position sensor is a spring-biased pin unaligned with a radius of the slip clutch.

4. The agricultural machine of claim 1, wherein the position sensor is a non-contact sensor, a pressure plate, or a thermocouple sensor coupled to the outer sleeve.

5. The agricultural machine of claim 1, wherein the outer sleeve includes a plurality of circumferential recesses, the slip clutch having a first operable position in which the plurality of torque-transfer members are positioned in a corresponding one of the plurality of circumferential recesses in the outer sleeve and a second operable position in which the plurality of torque-transfer members are displaced from the plurality of circumferential recesses in the outer sleeve.

6. The agricultural machine of claim 5, wherein the position sensor is a spring-biased pin, and wherein when the slip clutch is in the first position, the pin engages a distal end of the at least one torque transfer member and when the slip clutch is in the second position, the pin is positioned in the corresponding recess, wherein the signal is generated in response to the pin moving from the first position to the second position.

7. The agricultural machine of claim 6, wherein the pin is aligned with a radius of the slip clutch.

8. The agricultural machine of claim 6, wherein the pin is unaligned with a radius of the slip clutch.

9. A drive mechanism subassembly comprising:
   a drive shaft;
   a gear assembly selectively coupled to the drive shaft by a slip clutch, the slip clutch including
   an outer sleeve operatively coupled to the gear assembly,
   an inner sleeve positioned within the outer sleeve, the inner sleeve coupled to and rotatable with the drive shaft,
   a torque-transfer member movably coupled to the inner sleeve and configured to selectively couple the inner sleeve to the outer sleeve when a torque on the drive shaft is at a first value that is less than a predetermined threshold, and a position sensor in communication with the torque-transfer member and configured to output a signal in response to the torque on the drive shaft increasing from the first value; and wherein a control unit is in communication with the position sensor and configured to determine that the clutch is beginning to slip in response to receiving the signal.

10. The drive mechanism subassembly of claim 9, wherein the outer sleeve includes a circumferential recess, and wherein when the torque on the drive shaft is at the first value, the torque-transfer member is positioned in the circumferential recess in the outer sleeve and when the differential torque between the outer sleeve and the inner sleeve is greater than the predetermined threshold, the distal end of the torque-transfer member is displaced from the circumferential recess in the outer sleeve.

11. The drive mechanism subassembly of claim 10, wherein the position sensor is a spring-biased pin sensor that selectively engages the torque-transfer member, the pin extending through and being slidable relative to the outer sleeve.

12. The drive mechanism subassembly of claim 11, wherein the pin is unaligned with a radius of the slip clutch.

13. The drive mechanism subassembly of claim 11, wherein the pin engages a tapered surface of the torque-transfer member.

14. The drive mechanism subassembly of claim 13, wherein as the differential torque between the outer sleeve and the inner sleeve increases from the first value, the torque-transfer member is configured to rotate with the inner sleeve such that the tapered surface of the torque-transfer member linearly moves the pin to generate the signal.

15. The drive mechanism subassembly of claim 9, wherein the position sensor is configured to gradually recede into the outer sleeve thereby generating the signal in response to the differential torque between the outer sleeve and the inner sleeve increasing from the first value.

16. A drive mechanism subassembly comprising:
a drive shaft;
a gear assembly selectively coupled to the drive shaft by a clutch, the clutch including
   a gear assembly engaging member operatively coupled to the gear assembly,
   a drive shaft engaging member operatively coupled to the drive shaft and configured to selectively engage the gear assembly engaging member, and
   a sensor at least partially supported by the gear assembly engaging member and configured to output a signal in response to a differential torque between the gear assembly engaging member and the drive shaft engagement member being above a predetermined threshold;
wherein a control unit is in communication with the sensor and configured to alter an operating parameter of a machine associated with the drive mechanism subassembly in response to receiving the signal.

17. The drive mechanism subassembly of claim 16, further comprising a torque-transfer member positioned between the gear assembly engaging member and the drive shaft engaging member, the torque-transfer member configured to selectively couple the gear assembly engaging member and the drive shaft engaging member.

18. The drive mechanism subassembly of claim 17, wherein the sensor is a spring-biased pin sensor that selectively engages the torque-transfer member.

19. The drive mechanism subassembly of claim 17, wherein the sensor is a non-contact sensor, a pressure plate, an accelerometer, or a thermocouple sensor coupled to the gear assembly engaging member.

20. The drive mechanism subassembly of claim 16, wherein the control unit is configured to determine that the clutch is beginning to slip in response to receiving the signal.

* * * * *